United States Patent [19]

Besett

[11] Patent Number: 5,519,222
[45] Date of Patent: May 21, 1996

[54] 90 DEGREE PARALLEL PATH COLLIMATORS FOR THREE HEAD SPECT CAMERAS

[75] Inventor: James L. Besett, Chagrin Falls, Ohio

[73] Assignee: Picker International, Inc., Highland Hts., Ohio

[21] Appl. No.: 192,849

[22] Filed: Feb. 7, 1994

[51] Int. Cl.$^6$ .................................................. G01T 1/166
[52] U.S. Cl. ................................ 250/363.04; 250/363.1
[58] Field of Search ............................. 250/363.04, 363.1

[56] References Cited

U.S. PATENT DOCUMENTS 5,206,512  4/1993  Iwao ................................. 250/363.04

FOREIGN PATENT DOCUMENTS 250881   10/1989  Japan ................................ 250/363.04
3285196  12/1991  Japan ................................ 250/363.04

Primary Examiner—Carolyn E. Fields
Attorney, Agent, or Firm—Fay, Sharpe, Beall, Fagan, Minnich & McKee

[57] ABSTRACT

A three head SPECT camera system has three detector heads (22a, 22b, 22c) disposed at 120° intervals. Two of the detector heads have collimators (40a, 40b) which have a first set of vanes (42a, 42b) extending in a direction parallel to an axis of rotation (26) but which are canted 15° relative to a perpendicular, central axis (32a, 32b) of the respective detector heads. A second set of vanes (46a, 46b) extend perpendicular to the 15° tipped set of vanes to define a rectangular grid. When the second set of vanes is perpendicular to the detector heads, the first detector head is constrained to receive radiation along a first plurality of parallel rays (44a) and the second radiation detector head is constrained to receive radiation along a second plurality of parallel rays (44b). The collimators are mounted to the detector head such that the first and second parallel rays (44a, 44b) are perpendicular to each other. In this manner, a full 180° data set can be collected by rotating the detector heads only 90°.

5 Claims, 2 Drawing Sheets

90 DEGREE PARALLEL PATH COLLIMATORS FOR THREE HEAD SPECT CAMERAS

BACKGROUND OF THE INVENTION

The present invention relates to nuclear medicine. It finds particular application in conjunction with single photon emission computed tomography (SPECT) and will be described with particular reference thereto.

In early nuclear or Anger cameras, a patient was injected with a radioactive dye and a nuclear camera head was positioned stationarily over the region of interest. The nuclear camera head included a scintillation crystal which produced a flash or scintillation of light each time it was struck by radiation emanating from the radioactive dye in the subject. An array of photomultiplier tubes and associated circuitry produced an output signal which was indicative of the (x,y) position of each scintillation on the crystal.

To assure that the radiation causing each scintillation came from a known path through the patient, a collimator was placed on the patient face of the scintillation crystal. The collimator typically included a rectangular grid of lead vanes which assured that each scintillation was produced by radiation travelling along a path from the patient substantially perpendicular to the scintillation crystal face.

Other collimators were developed to magnify the region of interest. In a cone beam collimator, the vanes were tapered such that all the vanes pointed at a common focal point. Radiation reaching the scintillation crystal was constrained by the cone beam collimator to radiation travelling along divergent paths in both the x and y direction such that the entire scintillation crystal was used to examine a relatively small region of interest. This magnification improved the resolution in both planar dimensions. Rather than magnifying in two dimensions, fan beam collimators were developed which magnified in one dimension. That is, the vanes were oriented such that the vanes focused the radiation on a focal line, rather than a focal point.

The data collected by the nuclear camera was analogous to one projection view or, more accurately, one view of each of a plurality of slices of CT data. By rotating or indexing the detector head to a multiplicity of orientations circumferentially around the subject, a full set of CT data could be collected and reconstructed using conventional CT type algorithms.

Due to the great weight of the detector head and the lead collimator, a counterweight was often used to counterbalance the rotating detector head. Rather than using a passive counterweight, SPECT cameras have also been built using a second detector head positioned opposite to the first. Two oppositely disposed detector heads substantially double the data collection rate. Similarly, positioning three heads at 120° intervals around the subject, the data collection rate was substantially tripled. For many examinations, the three heads are positioned substantially touching such that the patient is substantially surrounded by radiation receptive surfaces.

CT reconstruction algorithms normally call for 180° of data to reconstruct a tomographic image. Thus, a single detector head needed to rotate about 180° around the subject to produce a complete 180° data set. A two-head camera still had to rotate 180° around the subject to get a full data set, but the full data set was a 360° data set. A three head camera needs to rotate about 120° around the subject to generate a full 360° data set.

By positioning two detector heads at 90° relative to each other, a full 180° of data can be collected with 90° of rotation. Even although the two 90° detector heads generate only a 180° data set rather than a 360° data set at a savings of only 30° of rotation relative to a three head camera, the more rapid scanning speed is perceived as advantageous for some applications. The two 90° detector heads have mechanical and data collection disadvantages.

The present invention provides a new and improved SPECT camera system which provides the advantages of two 90° detector heads, as well as the advantages of a three head SPECT system.

SUMMARY OF THE INVENTION

In accordance with the present invention, a collimator assembly is provided for a three head nuclear camera. Collimators mounted to a first and a second of the detector heads have vanes angled such that the radiation reaching the first detector head travels along paths that are perpendicular to paths travelled by radiation reaching the second detector head.

In the preferred embodiment, both collimators have their vanes slanted such that the paths are each offset by 15° from perpendicular to the detector head.

In accordance with another aspect of the present invention, a collimator for a three head SPECT camera is provided. The collimator has vanes that are angled at substantially 15°.

In accordance with another aspect of the present invention, a method of conducting a tomographic examination with a three head SPECT camera is provided. Radiation approaching first and second detector heads are collimated such that radiation received by the first detector head travels along a first set of parallel rays and radiation received by the second detector head is constrained to travel along a second set of parallel rays, the first and second sets of parallel rays being perpendicular.

A primary advantage of the present invention is that it enables a full data set to be collected with only 90° of rotation.

Another advantage of the present invention is that it provides a three head SPECT camera with the numerous advantages of a three head SPECT camera as well as the advantages of a two perpendicular head SPECT camera.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENT

Figure 1:
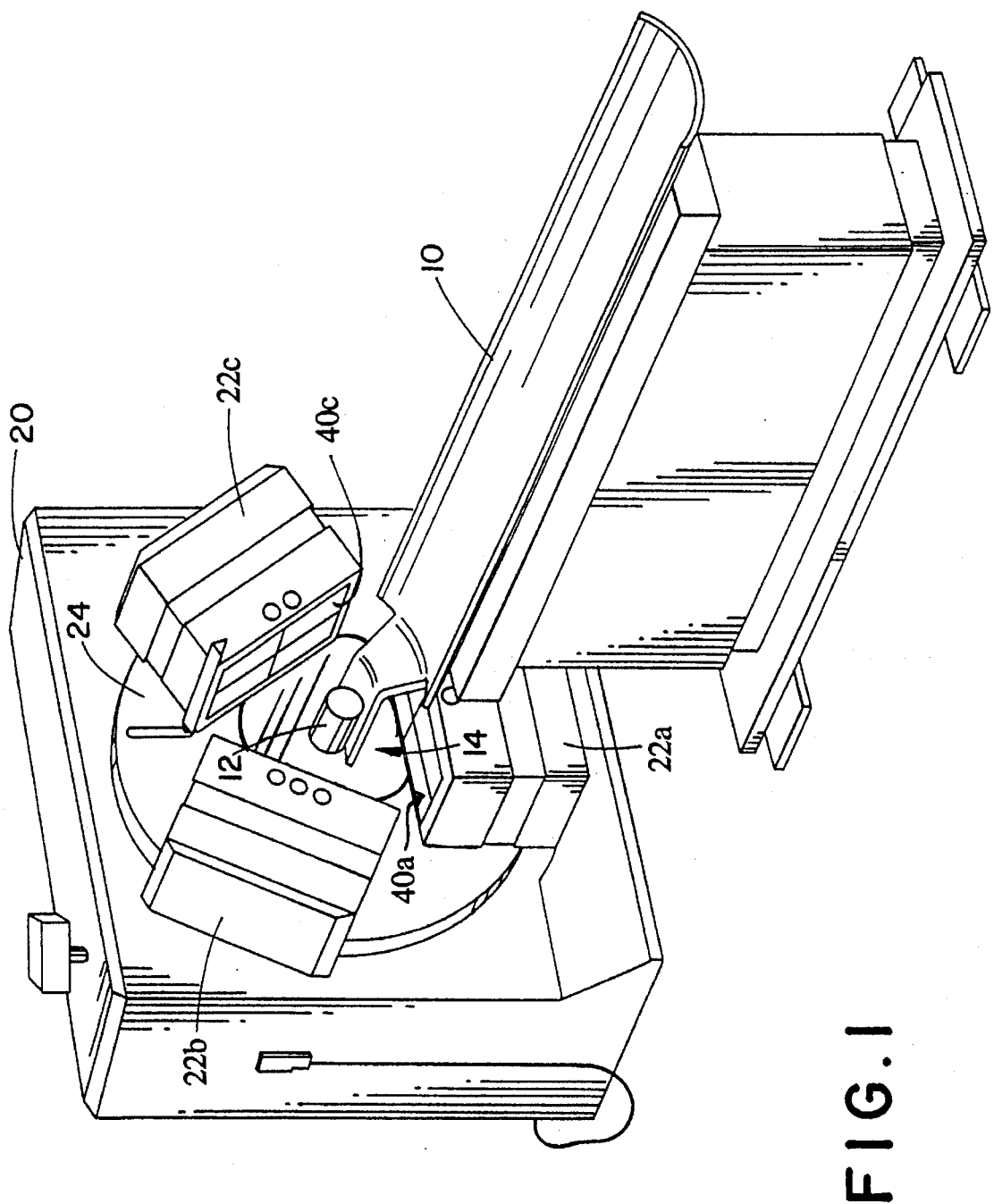
FIG. 1 is a diagrammatic illustration of a three head SPECT camera in accordance with the present invention; and, FIG. 2 is a detailed view in partial section illustrating the geometry of the radiation reception paths of the SPECT camera of FIG. 1.

With reference to FIG. 1, a SPECT camera assembly includes a subject couch or support 10 for holding a subject such as a phantom 12 or a human patient in an examination region 14.

Figure 2:
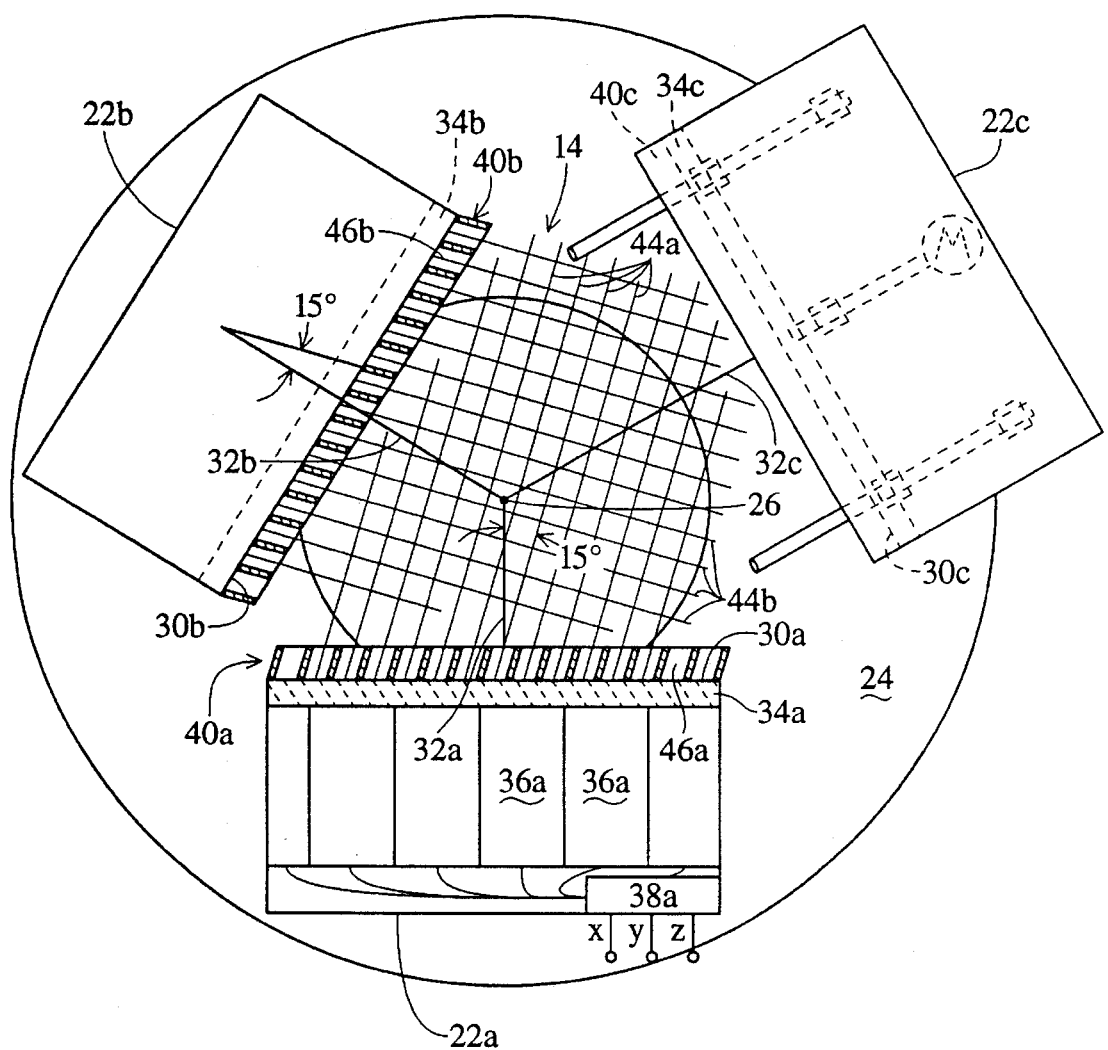

With continuing reference to FIG. 1 and further reference to FIG. 2, a gantry 20 supports three gamma camera detector heads 22a, 22b, and 22c at regular intervals around the examination region 14, i.e. at 120° intervals. A rotational drive assembly includes a rotating drum or face plate 24 to which the detector heads are mounted and a drive motor, bearing, and mechanical linkage assembly (not shown) for selectively rotating the face plate and detector heads around the examination region. The face plate 24 includes radially extending, linear tracks or guides upon which the detector heads are mounted. A linear drive, such as a motor, rotating drive screw, and a follower selectively slide the detector heads radially along the guide tracks to position and adjust the distance between a center of rotation 26 and each of the detector heads. The linear guides and the drive are illustrated in phantom on head 22c of FIG. 2 but omitted on the other heads and views for simplicity of illustration.

More specifically, each of the detector heads has a radiation sensitive face 30a, 30b, 30c, each having a central perpendicular axis 32a, 32b, 32c which intersects the center of rotation 26. Conventionally, a large sheet scintillation crystal 34a, 34b, 34c converts received radiation into flashes or scintillations of light. Photomultiplier tubes 36a, 36b, 36c packed preferably in a hexagonal close-packed array and associated resolver circuitry 38a, 38b, 38c convert each event into position coordinates (x,y) on the radiation receiving face 30a, 30b, 30c and an energy signal (z) indicative of the energy of each radiation event. An angular position resolver provides an indication of an angular orientation of the detector heads around the axis of rotation and a radial position resolver provides an indication of the distance between the center of rotation and the radiation sensitive face 30a, 30b, 30c of each detector head. The (x,y) position signal, the angular orientation signal, the radial displacement signal, and a knowledge of collimator configuration provide all the information needed to determine the ray or path travelled by the radiation for each received radiation event within the coordinate system of the patient. In this manner, the information can be converted into a three-dimensional tomographic image representation by a conventional reconstruction algorithm.

Each of the detector heads carries a collimator 40a, 40b, and 40c. In the preferred embodiment, the collimators 40a, 40b have a first set of vanes 42a, 42b which extend parallel to the axes of rotation and are sloped at 15° offset from the axes 32a, 32b, respectively. The collimators 40a, 40b are mounted to the respective detector heads 20a, 20b such that the first sets of vanes slope away from each other. Because the central axes are 120° offset relative to teach other and each of the collimators 40a, 40b subtract a 15° offset, the detector heads 20a, 20b are constrained to receive radiation which has travelled along rays 44a, 44b perpendicular to each other, i.e.:

$$120° - 2(15°) = 90° \qquad (1).$$

In this manner, two of the three heads of a three head SPECT camera that are offset by 120° can be effectively turned into the equivalent of a pair of 90° offset heads. This enables the two detector heads 20a, 20b to detect a full 180° set of data with 90° of rotation of the rotating face plate or gantry portion 24. Each collimator also includes a second set of vanes 46a, 46b which are perpendicular to the first set of vanes such that a grid is defined. When the second set of vanes are perpendicular to the detector face, parallel ray collimation is provided. When the second set of vanes are perpendicular to the detector face adjacent the center and progressively more angled toward the edges, fan beam collimation is provided.

In the preferred embodiment, the third detector head 22c is not utilized and is simply shut off. Preferably, the third detector head 22c carries a collimator 40c to equalize the weight distribution around the axis of rotation 26. The first and second detector heads 22a, 22b are moved as close to the axis of rotation 26 as the physical dimensions of the subject permit; whereas, the third detector head 22c is moved as far from the axis of rotation 26 as the radial adjustment means permits. Due to the difference in lever arm which this creates, the third collimator 40c is preferably lighter than the collimators 40a, 40b in order to compensate for the different relative radial positioning of the detector heads.

Rather than the collimators 40a, 40b having their vanes 42a, 42b offset at 15° from perpendicular, other angular offsets whose sum is 30° will also enable each detector to detect orthogonal data permitting the full 180° data set to be collected with 90° of rotation. As another alternative, the collimator vanes could be offset at angles which sum to a few degrees less than 30°. This would enable a full 180° data set to be collected by rotating the rotating gantry 24 only a few degrees more than 90°. As another alternative, in some applications it may be appropriate for the third detector head 22c to be active. If the collimator 40c has vanes tipped at an angle of substantially 45°, the detector head 22c will collect redundant data with one of camera heads 22a and 22b. When a 180° scan is to be conducted, a traditional parallel ray collimator 40c in which the vanes are parallel to the central axis 32c may be utilized. In this manner, three complete 180° data sets are generated in the same time that two sets would be generated with a two head camera.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. In a SPECT camera which has three radiation detector heads mounted for rotation about a center of rotation, each of the detector heads having a central perpendicular axis which (1) is perpendicular to a radiation receiving face of the detector head and (2) intersects said center of rotation, THE IMPROVEMENT COMPRISING:

a first collimator mounted to the radiation receiving face of a first of the detector heads, a second collimator mounted to the radiation receiving face of a second of the detector heads, the first and second collimators having vanes that are oriented such that the first collimator passes rays which are perpendicular to rays passed by the second collimator, the vanes of the first and second collimators being angled at 15° from the central perpendicular axes of the first and second detector heads, respectively; and a means for rotating the detector heads with the first and second collimators concurrently with the detector heads receiving radiation.

2. In a SPECT camera which has three radiation detector heads mounted for rotation about a center of rotation, the detector heads being mounted at 120° intervals around the center of rotation, each detector head having a radiation sensitive face which converts received radiation into scintillations of light and electronic circuitry for producing electronic signals indicative of coordinates on the radiation sensitive face at which each scintillation occurs and an angular position of the detector head when each scintillation occurs such that as the detector heads rotate about the center of rotation, the electronic signals are produced for radiation received at a multiplicity of angular positions of the detector heads around the center of rotation for reconstruction into a volumetric image representation, THE IMPROVEMENT COMPRISING:

a collimator mounted to each of two of the detector heads, the collimators having vanes that are oriented such that the collimator mounted to one of the heads passes radiation rays which are perpendicular to radiation rays passed by the collimator which is mounted to the other camera head, the vanes of the one collimator being offset by x° from perpendicular to the radiation sensitive face of the corresponding detector head and the other collimator having vanes offset by y° from the radiation receiving face of a other detector head, where x°+y°=30°.

3. A collimator system for a three head SPECT camera system in which the detector heads are rotatably mounted symmetrically at 120° intervals around an axis of rotation and in which the detector heads rotate through a multiplicity of angular positions around the axis of rotation during radiation detection, the collimator system comprising:

a first plurality of vanes extending parallel to each other and angled at substantially 15° and a second plurality of vanes extending parallel to each other and angled at substantially 15°, the first and second pluralities of vanes being mountable to first and second detector heads of the three head SPECT camera system, respectively, generally parallel to the axis of rotation and such that projections of the first and second pluralities of vanes define a square grid.

4. A method of using a SPECT camera system which has first, second, and third camera heads mounted for rotation about an axis of rotation, each camera head having a radiation receiving face that is oriented in a plane parallel to the axis of rotation, the first, second, and third detector heads being substantially 120° offset from each other around the axes of rotation, the method comprising:

collimating radiation received by the first and second detector heads such that the first detector head is constrained to receive radiation travelling along a first set of parallel rays and the second detector head is constrained to receive radiation travelling along a second set of parallel rays, which first and second sets of parallel rays are perpendicular to each other;

rotating the first, second, and third detector heads substantially 90° around the axis of rotation such that the first and second detector heads produce a full 180° set of parallel ray data;

reconstructing the full 180° set of parallel ray data into a tomographic image representation.

5. The method as set forth in claim 4 wherein in the collimating step, the first and second detector heads are constrained to receive radiation along parallel paths substantially 15° offset from a perpendicular path to the radiation receiving faces of the first and second detector heads respectively.

* * * * *